United States Patent [19]

Frohbach et al.

[11] 4,410,968
[45] Oct. 18, 1983

[54] METHOD AND APPARATUS FOR RECORDING ON A DISK SUPPORTED DEFORMABLE METALLIC FILM

[75] Inventors: Hugh F. Frohbach, Sunnyvale; Robert E. Myers, Menlo Park; Norman A. Peppers, Belmont, all of Calif.; Thomas L. Siwecki, 410 Civic Dr., Walnut Creek, Calif. 94596; Louis F. Schaefer, Palo Alto, Calif.

[73] Assignee: Thomas Lee Siwecki, Concord, Calif.

[21] Appl. No.: 187,779

[22] Filed: Sep. 16, 1980

Related U.S. Application Data

[63] Continuation of Ser. No. 948,906, Oct. 5, 1978, abandoned, which is a continuation of Ser. No. 781,056, Mar. 24, 1977, abandoned.

[51] Int. Cl.$^3$ .............................................. G11B 7/00
[52] U.S. Cl. .................. 369/44; 219/121 L; 219/121 LM; 430/945; 346/76 L; 346/77 E; 365/126; 358/344; 369/284; 369/111; 369/116; 369/288
[58] Field of Search ............. 369/111, 286, 275, 53, 369/288, 54, 284, 58, 104, 116, 44, 121, 47, 94; 365/47, 126, 120, 127; 346/76 L, 151, 77 E, 137, 135.1; 358/128.5, 129, 127, 297, 335, 342, 344; 430/945, 950, 346; 219/121 L, 121 LM; 427/53.1; 428/642

[56] References Cited

U.S. PATENT DOCUMENTS

| | | | |
|---|---|---|---|
| 3,314,073 | 4/1967 | Becker | 346/76 L |
| 3,430,966 | 3/1969 | Gregg | 369/111 |
| 3,626,386 | 12/1971 | Feinleib | 350/61 |
| 3,636,526 | 1/1972 | Feinleib | 346/76 L |
| 3,657,707 | 4/1972 | McFarland | 346/76 L |
| 3,665,425 | 5/1972 | Feinleib | 365/113 |
| 3,696,344 | 10/1972 | Feinleib | 350/160 R |
| 3,720,784 | 3/1973 | Maydan | 346/76 L |
| 3,889,272 | 6/1975 | Lou | 346/76 L |
| 3,927,252 | 12/1975 | Polley | 369/111 |
| 3,969,575 | 7/1976 | Gerritsen | 369/45 |
| 3,980,818 | 9/1976 | Browning | 369/32 |
| 3,983,317 | 9/1976 | Glorioso | 358/129 |
| 3,990,084 | 11/1976 | Hamisch | 346/135.1 |
| 4,037,251 | 7/1977 | Bricot | 369/109 |
| 4,038,524 | 7/1977 | Puech | 369/111 |
| 4,051,329 | 9/1977 | Blondet | 369/116 |

OTHER PUBLICATIONS

"Micromachining & Image Recording on Thin Film by Laser Beams" by Maydan, ©1971, The Bell. System Technical Journal, vol. 39, No. 6, Jul.-Aug. 1971, pp. 1761-1789.

"An Optical Disc Data Recorder" by Kenney, pp. 31, 35, COMPCON Digest, 2/28/77.

*Primary Examiner*—Alan Faber
*Attorney, Agent, or Firm*—Lewis Anten; Robert B. Block

[57] ABSTRACT

Information is stored, using a relatively low-power light beam, by redistributing the material in a deformable film. In a disc configuration, positioning of the light beam is achieved by referencing to a previously recorded track. In a document storage and retrieval system the document is scanned with the resultant scanned signal modulating the writing light beam producing a recorded track. This track is optically read with the resultant signal applied to a printer. For optimum utilization of the area, the recording and readout take place at constant velocity.

31 Claims, 4 Drawing Figures

METHOD AND APPARATUS FOR RECORDING ON A DISK SUPPORTED DEFORMABLE METALLIC FILM

This is a continuation of application Ser. No. 948,906, filed Oct. 5, 1978, now abandoned, which is a continuation of application Ser. No. 781,056 filed Mar. 24, 1977, now abandoned.

BACKGROUND OF THE INVENTION

1. Field of the Invention

This invention relates to document storage and retrieval systems. In a primary application the invention relates to storing information by using a modulated light source to redistribute the material of a deformable film coating.

2. Description of Prior Art

A variety of file systems have been considered for storing many documents onto a high resolution material. Microfilm systems optically reduce the original and photograph it on a high resolution emulsion. Photographic systems of this type, including scanned photographic systems, require time-consuming wet photography. Thus new entries to the file take considerable time to be made available. In addition, portions of a photographic film storage medium cannot be separately addressed at different times because the development process normally encompasses the entire film. Thus new documents cannot be added to an existing photographic storage medium. Photographic storage appears best-suited to applications where the entire plate is exposed in a single interval such as U.S. Pat. No. 3,198,880 "Photographic Disc Reproduction System for Television Signals" issued to P. M. G. Toulon on Aug. 3, 1965.

One solution to the problem of having the stored information immediately available is described in U.S. Pat. No. 3,314,073 "Laser Recorder with Vaporizable Film" issued to Carl H. Becker on Oct. 20, 1964. In this system a thin thermally vaporizable film is coated onto a plastic substrate. An intense laser, focused on the coating, is used to vaporize the coating and produce arrays of transparent holes representing the information on being stored. These can be immediately read out using light sources imaged at the holes.

This system, however, has a number of practical problems. Firstly, the large energies required to vaporize the film can only be realized by very expensive, high power lasers at the desired writing speeds. Secondly the strip format of the recording material, in the form of motion picture film, results in relatively slow accessing times to specific regions. Also the lack of an accurate tracking method results in relatively low resolution and thus inefficient use of the area in recording data.

Rapid accessing times can be achieved using the disc format where the radial motion is used to find the desired document and the circumferential motion is used to rapidly read it out. Disc recording is normally used in applications where the entire disc is written on in a single sequence. For example in the recording of television programs, as is done in the MCA Disco-Vision system, the entire disc is written at one time and copies are made from it. In document storage systems, however, where individual documents are added at different times, the disc presents serious tracking problems. If the disc is removed and then remounted, the resultant eccentricities of the tracks from a slightly off-center mounting can cause the tracks to cross and thus be destroyed. If large guard spaces are used to avoid track crossing, the storage area is used inefficiently and a limited number of documents can be stored. In addition to eccentricities, various warping and distortions of the recording media can also cause the subsequently recorded tracks to cross with previously recorded tracks and thus destroy the stored information.

In the MCA Disco-Vision system, as with other disc recording systems, the information is recorded and played back at constant angular velocity. This makes inefficient use of the area of the disc and results in recording power problems. Much greater recording power is needed in the outer diameter parts of the disc because of the increased relative motion between the disc and the modulated recording light source. In addition, the inner diameters have resolution problems because the information is packed more closely together. A given data rate, at the reduced relative motion, results in greater packing density. A relatively large inner region of the disc is often unused because of this consideration.

SUMMARY OF THE INVENTION

An object of this invention is to provide an information storage system which allows rapid writing from relatively low-power sources in a format which can be immediately read.

It is also an object of this invention to provide a document storage and retrieval system where the documents are rapidly scanned, stored on a relatively inexpensive media using a low power source, and are capable of being immediately and rapidly accessed, read out and printed.

It is a further object of this invention to provide a method of high-density recording on a disc without the recorded tracks overlapping due to distortion of the disc or a lack of concentricity during each recording interval.

It is a further object of this invention to provide a method of efficiently utilizing the area of the disc and the recording power by recording at a constant linear velocity.

Briefly, in accordance with the invention, a recording medium is used consisting of a deformable film deposited on a disc-shaped substrate. A modulated light beam causes local redistributions of the material of the deformable film resulting in information storage. To insure that the recorded tracks do not overlap, yet have a high packing density, a tracking light beam is used, having a fixed radial distance with respect to the modulated light beam, so that the tracks are accurately recorded with respect to the previously recorded track. For optimum use of the area of the disc, and to provide constant recording power requirements, the disc is rotated so as to maintain a constant linear velocity of the modulated light beam with respect to the rotating disc. In a document storage and retrieval system the document is scanned with the resultant signal modulating the writing light beam. On readout, the readout light beam produces a recording signal which is applied to a printer.

BRIEF DESCRIPTION OF THE DRAWINGS

For a more complete disclosure of the invention, reference can be made to the following detailed description of several illustrative embodiments thereof which is given in conjunction with the accompanying drawings, of which.

It is often desired to store information from documents and subsequently read them out in an automatic fashion to replace manual files. A convenient method of storage is the disc configuration shown in FIG. 1 where the data from the documents become tracks on the disc such as tracks 27 on disc 10. The original document, not shown, is scanned on document scanner 14. This can be a conventional facsimile scanner having the document on a rotating drum or a flatbed structure. The resultant scanned signal, in an appropriate form, is used to modulate the light from laser 12. This appropriate form can be the analog signal itself, or preferably a frequency modulated form of the signal where different values of reflectance on the document represent different frequencies in the signal. Alternatively, the scanned signal can be a digital representation of the document information. In this form it is convenient to use various forms of bandwidth compression, if desired.

Figure 1:
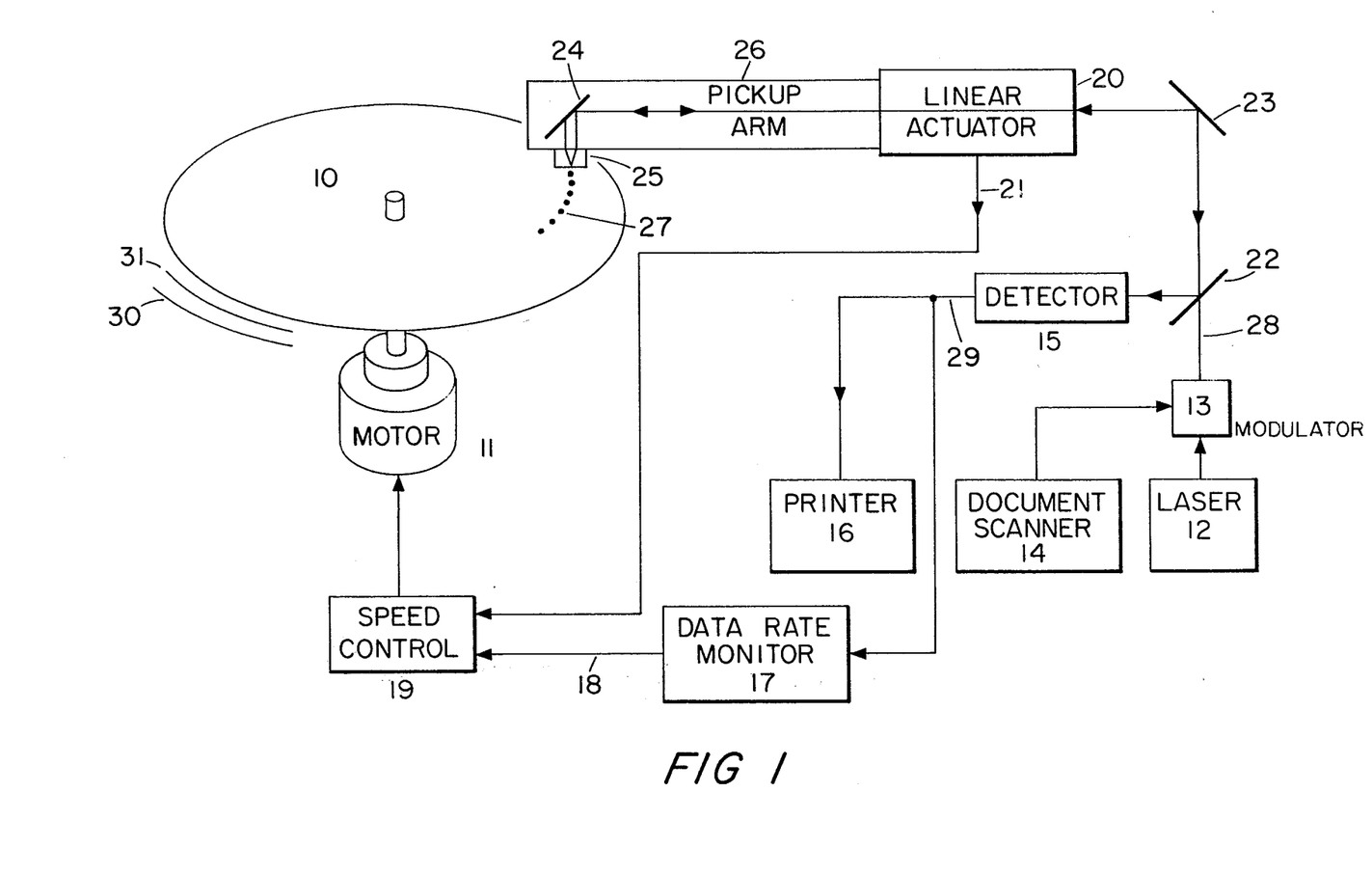
FIG. 1 is a schematic representation of an embodiment of the invention using a rotating disc.

The scanned signal is applied to modulator 13 which modulates the light from laser 12. The resultant modulated light beam 28, in reasonably collimated fashion is directed so as to be focused on the surface of disc 10. It goes through partially silvered mirror 22, is reflected by mirror 23, and goes through linear actuator 20 and pickup arm 26 to the recording region. Linear actuator 20 is used to move the pickup arm 26 radially with respect to rotating disc 20 while allowing the modulated light beam 28 to pass through. The modulated light beam is reflected by mirror 24 onto air bearing assembly 25 which includes the objective lens. The air bearing maintains the objective lens at a fixed distance from the surface of disc 10 to insure that the beam will be focused and produce a diffraction-limited spot.

Previous recording systems have used photographic emulsions. Although these are very sensitive, having modest light requirements, they result in a very limited and inconvenient system. The stored document information cannot be immediately read out since an awkward photographic development operation is required. Systems such as U.S. Pat. No. 3,314,073 described in the description of prior art, have used a vaporizable film where the laser power renders the film into the gaseous state and removes the material. These systems require very high laser powers and are thus awkward, expensive, and have limited data writing rates. In the system described here, a novel approach is used where the laser power causes a local deformation on a film by redistributing the material. Significantly reduced power is required since the material is not brought to the gaseous state. Also, since these redistributions are of a form which can be optically read out, the stored information is immediately available without any further processing. The size of the redistribution regions can be carefully controlled, using this reduced power, so as to provide high storage density.

Disc 10 consists of coating 31 on substrate 30. The coating can be a thin metallic film such as a 400 Angstrom film of tellurium. Coatings in the thickness range from 100 to 500 Angstroms would appear to be suitable. The material should be such that, with modest energies, it is brought momentarily to the liquid state. In this state, through surface tension, the material redistributes itself in a manner which allows it to be subsequently read out.

Figure 2:
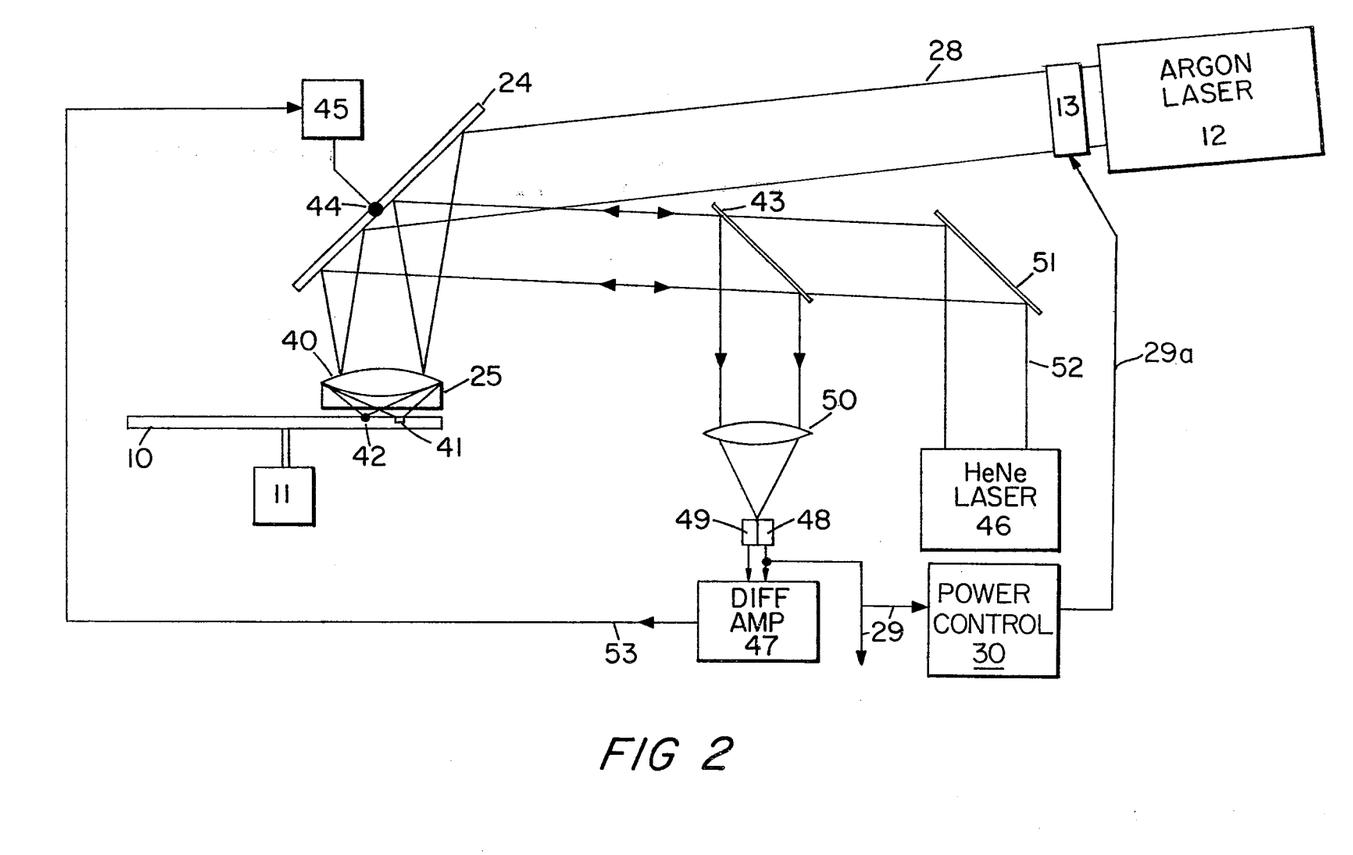
FIG. 2 is a cross-sectional representation of an embodiment of the storage medium.

The same configuration of FIG. 2 can be used for reading out the stored document and displaying it. Light beam 28 from laser 12 is now used in an unmodulated fashion with document scanner 14 and modulator 13 not functioning. This light beam, focused on recorded track 27 is selectively reflected by the redistributions of material on deformable film 31 to create a reflected light beam containing the document information. This light beam traverses the same path as the incident light beam, in the opposite direction. Part of it is reflected by partially silvered mirror 22 and detected by detector 15. This detector can be a photocell which produces the recording signal 29. This signal can be applied to printer 16 which is a standard facsimile printer using any of a variety of techniques to convert signal 29 into variations of reflectance on a substrate. Some of the printing methods currently used include electrochemical, thermal, electrostatic, and mechanical. These are all commercially available. Alternatively, the signal can be applied to a television type display system where it can be viewed. An intermediate storage system can be used to store the recording signal so that it can be repeatedly applied to the display.

Previous disc recording systems have used constant angular velocity, with the motor speed remaining constant. This results in increased writing power requirements at the outer radii of the disc where the linear velocity is greatest. In addition, the area of the disc is inefficiently used since the data is excessively packed together at the inner radii. Usually only a limited area of the disc is used in these systems. In FIG. 2, these problems are solved by recording and playing back with a constant linear velocity.

On recording a radial indicating signal 21 is derived from linear actuator 20 which indicates the radial position of the objective lens assembly 25. This radial indicating signal is applied to motor speed control 19 which controls motor 11 such that the product of the radius and the motor speed remain a constant. This provides constant linear velocity of the focused modulated light beam with respect to the surface of the disc 10.

On playback, recording signal 29 is applied to the data rate monitor 17. This monitor measures the data rate of this signal 29 and applies an error signal 18 to motor speed control 19 so as to keep the data rate constant. A constant data rate corresponds to constant linear velocity if the track has been recorded at constant linear velocity.

The data rate monitor can simply measure the bit rate if a digital format is used. If a frequency modulated format is used the data rate monitor can measure the frequency during the synchronization pulse regions where the frequency should be a constant. Alternatively, if a buffered system is used with the printer 16, the data rate monitor can measure the status of the buffer.

FIG. 1 shows an embodiment where the recording and playback are conveniently used in a single system. In some applications it may be more convenient to use separate systems. For example, a disc containing a number of stored documents could be used with a number of readout systems where these documents are printed out or displayed. The readout-only system normally requires a lower power light source and no light modulator and is thus less expensive.

In many existing systems all of the information is written onto the disc at a single time interval without ever removing the disc and replacing it. In these the registration of each newly written track with respect to the previously recorded tracks is reasonably accurate since there is no problem of concentricity. However, even in these systems, subtle warpage or other distortions of the disc between recording periods can cause problems. The newly reduced tracks can overlap previously recorded tracks, thus destroying information. This problem is avoided by increasing track spacing, thus reducing the storage capability.

This tracking problem is particularly aggravated in systems where the disc is removed and then replaced, as would be the case in the desirable versatile arrangements. Here the eccentricity caused by the replaced disc not being exactly centered again can cause the tracks to cross and destroy information. If guard bands are placed between recording intervals, much of the information storage capacity is lost.

This problem is solved by the unique approach illustrated in FIG. 2. Here the focused modulated light beam 42 is referenced to a previously recorded track 41 so as to insure that the tracks maintain the desired spacing independent of eccentricity or distortion. Initially a reference track is written on the outer periphery of the disc. This can be done using a lead screw to radially drive a light source while the disc is being rotated. A tracking light source, positioned a fixed radial distance with respect to the modulated light source, is used to track the reference track and thus position the writing beam. As new tracks are written, the tracking beam tracks those to accurately position the focused modulated light beam with respect to the previously recorded track.

In FIG. 2 the modulated light beam 28 is produced by an argon laser source 12 and modulator 13. This beam is transmitted through dichroic mirrors 51 and 43. These mirrors are transmissive to the shorter wavelength of the argon laser and reflective or partially reflective to the longer wavelength of the helium neon laser 46 which is the source of the tracking light beam 52. The modulated light beam 28 is then reflected off controllable mirror 24 and focused by objective lens 40 onto the surface of rotating disc 10 to produce focused modulated light beam 42.

The tracking light beam 52 is reflected from dichroic mirror 51 and is partially transmitted by the partially reflective dichroic mirror 43. It is then also reflected off controllable mirror 24, at a slightly different angle, and focused by lens 40 to produce a focused tracking beam at track 41 which is displaced a fixed radial distance from the focused modulated light beam 42. The light reflected from track 41 traverses the same optical path in the opposite direction and is partially reflected off partially reflecting dichroic mirror 43. This reflected beam is focused by lens 50 onto adjacent photocells 48 and 49. Their outputs are applied to difference amplifier 47. This amplifier subtracts the two photocell outputs to form error signal 53. This signal will be zero when the two outputs are equal which corresponds to the focused tracking beam being exactly on the previously recorded track 41. If it is off on either side, either photocell 48 or 49 will have a greater output, generating a positive or negative error signal 53. This error signal is coupled to the mirror actuator system 45 which drives rotator 44 and thus pivots mirror 24 in response to signal 53. The mirror actuator system 45 can be a servo-amplifier with rotator 44 a servo-motor. As mirror 24 rotates the focused tracking light beam is brought onto the center of previously recorded track 41 and the focused modulated light beam 42 is simultaneously moved to remain a fixed radial distance from the focused tracking light beam. Thus the focused modulated light beam is kept a fixed radial distance from the previously recorded track.

The mirror 24, rotator 44 and objective lens holder 25 are all supported by pickup arm 26 of FIG. 1. This pickup arm is moved radially by linear actuator 20 which provides the coarse radial motions which brings the tracking system into the vicinity of the correct track. The rotating tracking mirror 24 has a range of a number of tracks so that the coarse radial position provided by linear actuator 20 needn't be very accurate.

The tracking light system can also be used in the readout mode without using the modulated light beam 28 from the argon laser 12. As the focused tracking light beam tracks the previously recorded tracks it is providing a readout of these tracks in addition to a tracking error signal 53. For example the output of either photocell, such as 48 as shown, can be used for the readout signal 29 which is then applied to the display system or printer 16. Alternatively, the sum of the two photocells 48 and 49 can be used for readout signal 29.

Assembly 25 in FIGS. 1 and 2 contains the objective lens 40 which must be kept a fixed distance from the surface of disc 10. This can be accomplished by an air bearing system such as the one described in U.S. Pat. No. 3,947,888 "Hydrodynamic Bearing Head Providing Constant Spacing" issued to Manfred H. Jarsen on Mar. 30, 1976.

Figure 3:
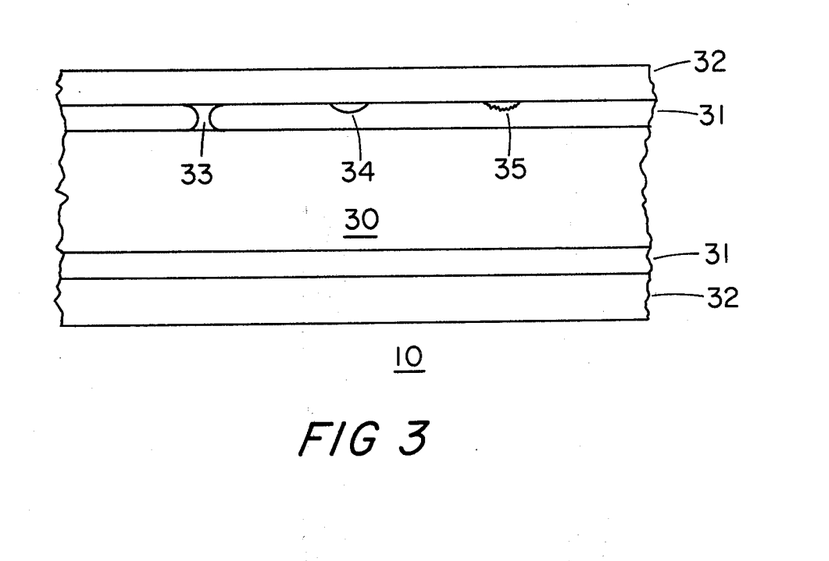
FIG. 3 is a schematic representation of a tracking system.

As shown in FIG. 3, a number of methods may be used to redistribute the material in deformable film 31. Referring to the upper layers only and ignoring the lower layers, the incident energy causes the material in film 31 to become momentarily liquified. Due to phenomena such as surface tension the material redistributes itself in a new configuration which can be subsequently read out. With sufficient incident power the material in deformable film 31 will redistribute itself so as to form a void 33. This can be read out in a number of ways. For example, the variation in light transmission can be measured by transmitting a focused readout beam through the film to a photocell on the other side of the substrate. Generally, however, it is more convenient to have the readout beam measure variations in reflected light as shown in FIGS. 1 and 2.

The variations in reflection can be enhanced by the use of an additional anti-reflection coating 32 placed between the deformable film 31 and the light source. Firstly, however, this film has an important function in the writing operation by matching the modulated light beam to the deformable film 31. Anti-reflection coating 32 can provide matching by being a quarter wave thick at the writing wavelength and having a refractive index which is the geometric mean of that of free space and that of the deformable film. Alternatively it can be a more complex multilayer coating. The film will thus minimize the reflections of the modulated light beam so that most of the energy goes into deformable film 31.

The coating 31 can serve a variety of functions in the reflective readout mode. For example it can miminize the reflections of the readout beam from the film, and result in large reflections in the vicinity of voids 33 because the coating 32 is intentionally not matched to the substrate material 30. Alternatively, when using a readout wavelength different from that of the writing beam, a relatively large reflection can be obtained at the metal film and a small reflection at the void since, at the readout wavelength, the coating 32 is better matched to the substrate 30 than the deformable film 31. Here the readout signal will have the opposite polarity since it will decrease in the written regions.

The power requirements are further diminished by having the modulated light beam liquefy only the upper portion of the film. Here the material will redistribute itself in the forms shown in 34 and 35 where the depth of the resultant distribution is less than the original film thickness. In 34 the material has redistributed itself into a concave region and in 35 it has become a concave diffuse region because of the material used. These are also read out due to their varying reflectivity. This variation is due to combinations of effects. One effect is the partial destruction of the matching between anti-reflection coating 32 and the deformable film 31 due to the small separation. This causes increased reflections at the exposed regions. Another effect is the spreading of the reflected light caused by the concavity 34. This can cause an effective increase or decrease in reflectivity depending on the remainder of the optical system. The lens action of the concavity can cause the reflected beam to be more or less concentrated on the receiving photocell as determined by the optics. The diffuse region 35 will, in general, cause a spreading of the light beam without lens action. This effect alone will result in an effective decrease in reflectivity.

It is important to note that the particular mode of operation is determined by the power level of the modulated light beam. To maintain this at its proper value, the newly written track can be immediately read out with the resultant signal used to control the power of the modulated light beam. For example, referring to FIG. 2, the signal from a previously written track, such as signal 29, is used to control the recording power level, such as by applying it to modulator 13. The readout should be done at some information independent portion of the track, such as a portion corresponding to a synchronization region, which should always produce the same readout signal.

The ability to use the anti-reflection coating 32, with is many advantages is a result of the novel recording scheme used where the film material is redistributed by the modulated light beam. In the prior art, where high powers are used to vaporize the material, this coating could not be used since it does not permit the escape of the vaporized material.

As shown in FIG. 3, both sides of the disc can be used. An additional deformable film 31 and anti-reflection coating 32 is deposited on the underside of the substrate 30. This can be separately written on and read out in the same manner previously described to double the storage capacity of each disc.

Figure 4:
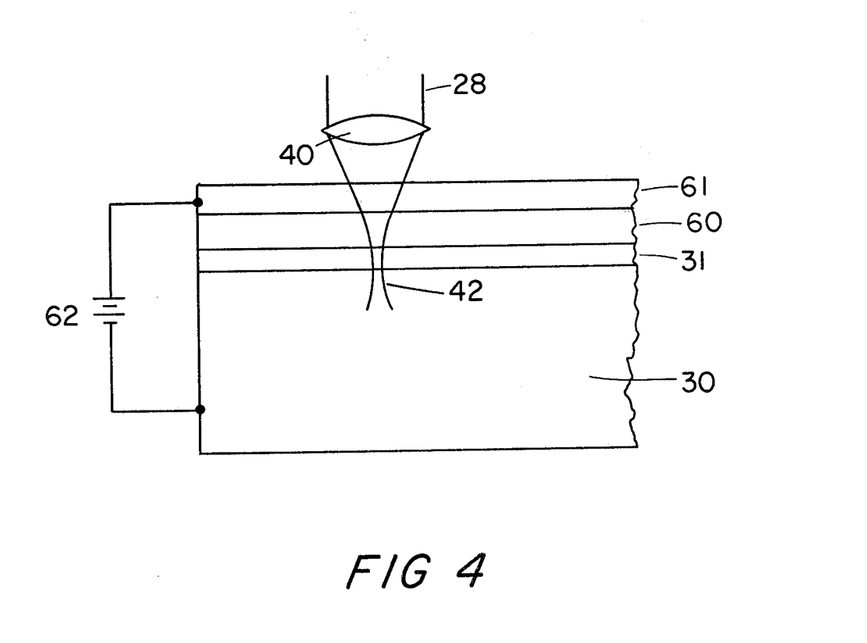
FIG. 4 is a schematic representation of an embodiment of the storage medium using electrical energy for addressing.

In the systems discussed thus far the writing modulated light beam itself caused the redistribution of material in the deformable film 31. An alternate embodiment is shown in FIG. 4 where the modulated light beam acts as a control of another energy source which contributes to the process of redistributing the material in deformable film 31. Here a photoconductor 60 and a transparent conductor 61 are deposited on the deformable film 31. If desired, these coatings can also have some of the anti-reflection properties of coating 32 previously described. In addition, substrate 30 is made of conductive material. A power source 62 is connected between the transparent conductor 61 and the conducting substrate 30. The modulated light beam 28, as before, is focused by objective lens 40 to form a focused spot 42 in the region of the photoconductive coating 60 and the deformable film 31. This focused modulated light beam changes the photoconductor from an insulator to a conductor, thus completing the electrical path in the vicinity of the focused light beam 42. This electrical energy is then applied to that region of deformable film 31 and contributes to the process of redistributing the material of the film to create the writing action.

Although most of the embodiments illustrated used readout in the reflection mode, light transmission can also be used where the readout beam and photocell pickup are on opposite sides of the disc. This mode, however, is limited to the redistribution arrangement 33 of FIG. 3 where a void is created. It is also limited to recording the information on one side of the substrate 30.

Formats other than the disc format illustrated can be used with this system. The deformable film can be used in a rotating drum configuration with the light sources appropriately translated along the axis of the drum. Alternatively the deformable film can be used in a flat bed format where the light beams are mechanically or electro-optically scanned across the stationary deformable film. In all of the formats the tracking while writing can be accomplished by referencing to a previously recorded track as was described for the disc format.

The systems as described used the signal from a scanned document to modulate the writing light beam to produce the redistributions of material on the deformable film. The information used to modulate the light beam can, of course, be any signal source. One important application is the storage of digital information. Thus modulator 13 in FIG. 1 can be driven by a digital signal derived from a computer. The signal 29 read out by detector 15 will then be the desired digital information.

The track format on disc 10 will generally be a spiral so that continuous information can be recorded over more than one track. In some applications, however, it may be convenient to use a concentric ring format. In this case the linear actuator 20, rather than moving continuously, moves in radial steps following each revolution of disc 10.

Under some conditions disc 10 in FIGS. 1 and 2 may be subject to excessive vibration. Under those circumstances air bearing assembly 25 may not be able to adequately follow these variations, especially when they occur at a relatively high frequency. This problem is solved by the use of a forced air system, not shown, on the underside of the disc 10. This forced air can be derived from an annular array of apertures positioned under the disc. The air creates a force proportional to position which both reduces the amplitude and frequency of the vibration. In addition, it provides a viscous force which damps the vibration. These effects bring the variations within the range of air bearing assembly 25.

What is claimed is:

1. Apparatus for recording information as variations in reflectance comprising: a substrate,
    a deformable metallic tellurium film deposited on said substrate in a disc format;

a modulated light beam representing the information to be recorded, means for focusing the beam onto the metallic deformable film, said beam having an intensity which is sufficient to liquefy but not vaporize the material of the metallic deformable film resulting in a redistribution of the material of the metallic deformable film which changes the reflectance of a readout light beam; andd means for rotating the disc with respect to the modulated light beam and radially translating the modulated light beam to produce a pattern of recorded reflectivity information.

2. Apparatus for recording information as variations in reflectance comprising:

a metallic deformable film deposited on a substrate in a disc format;

a modulated light beam representing the information to be recorded, means for focusing the beam onto the metallic deformable film said beam having an intensity which is sufficient to liquefy but not vaporize the material of the metallic deformable film resulting in a redistribution of the material of the metallic deformable film which changes the reflectance of a readout light beam wherein the redistribution of material in the metallic deformable film results in partial removal of the material in the film in the region of the focused modulated light beam so that the depth of the resultant distribution is less than the original film thickness whereby the reflectance is changed with a low intensity of the modulated light beam; and further results in the removed material being redistributed by surface tension as a raised ridge surrounding the displaced concavity, the combination of concavity and surrounding ridge having enhanced readability; and means for rotating the disc with respect to the modulated light beam and radially translating the modulated light beam to produce a pattern of recorded reflectivity information.

3. Apparatus as recited in claims 1 or 2 wherein the metallic deformable film is between 100 and 500 Angstroms thick.

4. Apparatus as recited in claim 1 wherein the redistribution of the material of the metallic deformable film results in a void in the film in the region exposed to the modulated light beam.

5. Apparatus as recited in claim 1 including means for reading the recorded information shortly after it is recorded using an additional light beam focused onto newly written variations in reflectance to provide a signal which is used to control the power of the modulated light beam.

6. Apparatus as recited in claim 5 wherein the signal which is used to control the power of the modulated light beam is derived from portions of the recording which are independent of the information being recorded.

7. In a method for recording information as variations in reflectance the steps of:

modulating a light beam with the information to be recorded;

focusing the modulated light beam on a metallic tellurium deformable film deposited on a rotating disc;

radially translating the modulated light beam with respect to the disc; and redistributing the material of the metallic deformable film in the region of the focused modulated light beam to change its reflectance with the modulated light beam having sufficient energy to liquefy but not vaporize the material.

8. In a method for recording information as variations in reflectance the steps of:

modulating a light beam with the information to be recorded;

focusing the modulated light beam on a metallic deformable film deposited on a rotating disc;

radially translating the modulated light beam with respect to the disc; and redistributing the material of the metallic deformable film in the region of the focused modulated light beam to change its reflectance by removing only a part of the material of the metallic deformable film in the region of the focused modulated light beam so that the depth of the resultant redistribution is less than the original film thickness, with the modulated light beam having sufficient energy to liquefy but not vaporize the material.

9. Apparatus for recording information as variations in reflectance comprising:

a metallic deformable film deposited on a substrate in a disc format;

a modulated light beam representing the information to be recorded means for focusing the beam onto the metallic deformable film said beam having an intensity which is sufficient to liquefy but not vaporize the material of the metallic deformable film resulting in a redistribution of the material of the metallic deformable film which changes the reflectance of a readout light beam;

means for rotating the disc with respect to the modulated light beam and radially translating the modulated light beam to produce a pattern of recorded reflectivity information; and means for reading the recorded information shortly after it is recorded using an additional light beam focused onto newly written variations in reflectance to provide a signal which is used to control the power of the modulated light beam.

10. Apparatus for recording a linear data information stream as a linear array of discrete, minute variations in seriatim in the reflectance or transmission of light from a recorded sheet of material and for retrieving information therefrom comprising:

a deformable metal film deposited on a substrate to form a recordable sheet and having a free surface away from said substrate, a laser source for generating a modulated laser light beam containing digital information to be recorded on said film as time spaced variations in intensity, means for focusing and modulating said laser beam onto the deformable film with a pulse of an intensity sufficient to liquefy the film at its free surface but less than that which would vaporize the material of the film so that momentary liquefaction of the film material is achieved in a region of the impinging modulated laser beam to form a depression in the center of a melted region about which the melted region reshapes to form a surrounding raised ridge thereafter frozen into the shape of a rim surrounding the depression to produce an individual pattern of recorded information which is readable by interaction with a readout light beam, means for moving the sheet with respect to the modulated laser beam to produce a retraceable pattern of recorded reflectivity information thereon in seriatim along a path of discrete impressions formed by the successive depressions and ridges, and laser beam means for recovering the recorded data and information by causing a read laser beam to impinge along said path so as to interact in seriatim with successive depressions and ridges, and means for sensing the transmission or reflectivity caused thereby to recover the one dimensional array of information so recorded.

11. Apparatus as recited in claim 10 wherein the means for moving the modulated light beam includes means for optically tracking a previously recorded track on the sheet and moving the modulated light beam laterally with respect to the previously recorded track.

12. Apparatus as recited in claims 10 wherein the metallic film is tellurium.

13. Apparatus as recited in any one of claims 10, 11 or 12 wherein the metallic deformable film is between 100 and 500 Angstroms thick.

14. Apparatus as in claim 10 further including an antireflection coating on the illumination side of the metallic deformable film whereby the modulated light beam is efficiently coupled to the deformable film.

15. Apparatus as recited in claim 10 including an anti-reflection coating disposed on the illumination side of the deformable film which, at the wavelength of the read-out light beam, is better matched to the deformable film than the substrate so that there is an enhanced energy coupling to the film as distinguished from the substrate whereby the regions of the films containing deformations result in increased reflections therefrom.

16. Apparatus as recited in claim 10 including an anti-reflection coating disposed between the deformable film and substrate, which coating is better matched to the substrate than the deformable film itself, the anti-reflection coating defining an energy coupling state between the respective layers such that regions of the film containing deformations result in decreased reflections.

17. Apparatus as in claim 10 wherein the information used to modulate the light beam is derived by scanning a document and using the resultant scanned signal to produce a frequency modulated signal to control the modulated light beam.

18. Apparatus as in claim 10 further including means for reading the recorded information shortly after it is recorded to provide a signal which is used to control the power of the modulated light beam.

19. Apparatus as in claim 18 wherein the signal which is used to control the power of the modulated light beam is derived from portions of the recording which are independent of the information being recorded.

20. A method for recording a linear data stream as discrete, minute variations in the reflectance or transmission of light from a recorded sheet of material and for retrieving information therefrom using
a deformable metal film deposited on a substrate to form a recordable sheet and having a free surface away from said substrate, a laser source for generating a modulated laser lightbeam containing digital information to be recorded on said film as time spaced variations in intensity comprising the steps of: focusing and modulating said laser beam onto the deformable film with a pulse of an intensity sufficient to liquefy the film at its free surface but less than that which would vaporize the material of the film so that momentary liquefaction of the film material is achieved in a region of the impinging modulated laser beam to form a depression in the center of a melted region about which the melted region reshapes to form a surrounding raised ridge thereafter frozen into the shape of a rim surrounding the depression to produce an individual pattern of recorded information which is readable by interaction with a readout lightbeam, moving the disc with respect to the modulated laser beam to produce a retraceable pattern of recorded reflectivity information thereon as a series of the discrete impressions formed by the sets of depressions and surrounding ridges, recovering the recorded data by causing a read laser beam to impinge along said path and to interact with the set of depressions and ridges in seriatim and sampling the transmission or reflectivity characteristic thereof for recovering the information.

21. The method of claim 20 wherein the step of moving the modulated light beam includes the step of tracking a previously recorded track and moving the modulated light beam with respect to the previously recorded track.

22. The method of claim 20 including the step of scanning a document and using the resultant scanned signal to produce a frequency modulated signal for the recording information.

23. The method of claim 20 including the steps of:
reading the recorded information shortly after it is recorded; and
controlling the power of the light beam with a signal derived from the recently recorded information to establish the correct recording level.

24. The method of claim 20 or 23 wherein the step of redistributing the material of the metallic deformable film includes the step of redistributing only a part of the material from the metallic deformable film in the region of the focused modulated light beam.

25. Apparatus for recording information as variations in reflectance comprising:
a metallic deformable film deposited on a substrate in a disc format;
a modulated light beam representing the information to be recorded, means for focusing the beam onto the metallic deformable film said beam having an intensity which is sufficient to liquefy but not vaporize the material of the metallic deformable film resulting in a redistribution of the material of the metallic deformable film which changes the reflectance of a readout light beam wherein the redistribution of material in the metallic deformable film results in partial removal of the material in the film in the region of the focused modulated light beam so that the depth of the resultant distribution is less than the original film thickness whereby the reflectance is changes with a low intensity of the modulated light beam; and further results in the removed material being redistributed by surface tension as a raised ridge surrounding the removed portion, the combination of a concavity and surrounding ridge having enhanced readability,
means for rotating the disc with respect to the modulated light beam and radially translating the modulated light beam to produce a pattern of recorded reflectivity information; and
means for reading the recorded information shortly after it is recorded using an additional light beam focused onto newly written variations in reflectance to provide a signal which is used to control the power of the modulated light beam.

26. Apparatus for recording information as variations in reflectance comprising:
a metallic deformable film deposited on a substrate in a disc format;
a modulated light beam representing the information to be recorded, means for focusing the beam onto the metallic deformable film said beam having an intensity which is sufficient to liquefy but not vaporize the material of the metallic deformable film resulting in a redistribution of the material of the metallic deformable film which changes the reflectance of a readout light beam wherein the redistribution of material in the metallic deformable film results in partial removal of the material in the film in the region of the focused modulated light beam so that the depth of the resultant distribution is less than the original film thickness whereby the reflectance is changed with a low intensity of the modulated light beam; and further results in the removed material being redistributed by surface tension as a raised ridge surrounding the removed portion, the combination of a concavity and surrounding ridge having enhanced readability,
means for rotating the disc with respect to the modulated light beam and radially translating the modulated light beam to produce a pattern of recorded reflectivity information; and
means for reading the recorded information shortly after it is recorded using an additional light beam focused onto newly written variations in reflectance to provide a signal which is used to control the power of the modulated light beam, the signal used to control the power of the modulated light beam being derived from portions of the recording which are independent of the information being recorded.

27. In a method for recording information as variations in reflectance the steps of:
modulating a light beam with the information to be recorded;
focusing the modulated light beam on a metallic tellurium deformable film deposited on a rotating disc;
radially translating the modulated light beam with respect to the disc,
redistributing the material of the metallic tellurium deformable film in the region of the focused modulated light beam to change its reflectance by removing only a part of the material of the metallic tellurium deformable film in the region of the focused modulated light beam so that the depth of the resultant redistribution is less than the original film thickness, with the modulated light beam having sufficient energy to liquefy but not vaporize the material, and
reading the recorded information shortly after it is recorded using an additional light beam focused onto newly written variations in reflectance; and
controlling the power of the light beam with a signal derived from the recently recorded information to establish the correct recording level.

28. In a method for recording information as variations in reflectance the steps of:
modulating a light beam with the information to be recorded;
focusing the modulated light beam on a metallic deformable film deposited on a rotating disc;
radially translating the modulated light beam with respect to the disc,
redistributing the material of the metallic deformable film in the region of the focused modulated light beam to change its reflectance by removing only a part of the material of the metallic deformable film in the region of the focused modulated light beam so that the depth of the resultant redistribution is less than the original film thickness, with the modulated light beam having sufficient energy to liquefy but not vaporize the material, and
reading the recorded information shortly after it is recorded using an additional light beam focused onto newly written variations in reflectance; and
controlling the power of the light beam with a signal derived from the recently recorded information to establish the correct recording level.

29. Apparatus for recording information as variations in reflectance comprising:
a metallic deformable film of tellurium deposited on a substrate in a disc format;
a modulated light beam representing the information to be recorded, means for focusing the beam onto the metallic deformable film, said beam having an intensity which is sufficient to liquefy but not vaporize the material of the metallic deformable film resulting in a redistribution of the material of the metallic deformable film which changes the reflectance of a readout light beam wherein the redistribution of material in the metallic deformable film results in partial removal of the material in the film in the region of the focused modulated light beam so that the depth of the resultant distribution is less than the original film thickness whereby the reflectance is changed with a low intensity of the modulated light beam; and further results in the removed material being redistributed by surface tension as a raised ridge surrounding the removed portion, the combination of a concavity and surrounding ridge having enhanced readability; and
means for rotating the disc with respect to the modulated light beam and radially translating the modulated light beam to produce a pattern of recorded reflectivity information.

30. Method for recording a linear data information stream as a one dimensional array of discrete, minute variations in the reflectance or transmission of light from a recorded sheet of material and for retrieving information therefrom comprising:
a deformable metal film depositing on a substrate to form a recordable sheet and having a free surface away from said substrate, generating a modulated laser beam containing the data information to be recorded on said film as time spaced variations in intensity, focusing and modulating said laser beam onto the deformable film with a pulse of an intensity sufficient to liquefy the film at its free surface but less than that which would vaporize the material of the film so that momentary liquefaction of the film material is achieved in a region of the impinging modulated laser beam to form a depression in the center of a melted region about which the melted region reshapes to form a surrounding raised ridge thereafter frozen into the shape of a rim surrounding the depression to produce an individual pattern of recorded information which is readable by interaction with a readout light beam, moving the sheet with respect to the modulated laser beam to produce a retraceable pattern of recorded reflectivity information thereon in seriatim along a path of discrete impressions formed by the successive depressions and ridges, and recovering the recorded data and information by causing a read laser beam to impinge along said path so as to interact in seriatim with successive depressions and ridges, and sensing the transmission or reflectivity caused thereby to recover the one dimensional array of information so recorded.

31. The method of claim 30 wherein the step of moving the modulated light beam includes optically tracking a previously recorded track on the sheet and moving the modulated light beam laterally with respect to the previously recorded track.

* * * * *